J. RIGBY.
APPARATUS FOR MANUFACTURING GAS FROM PETROLEUM, &c.
No. 186,692. Patented Jan. 30, 1877.
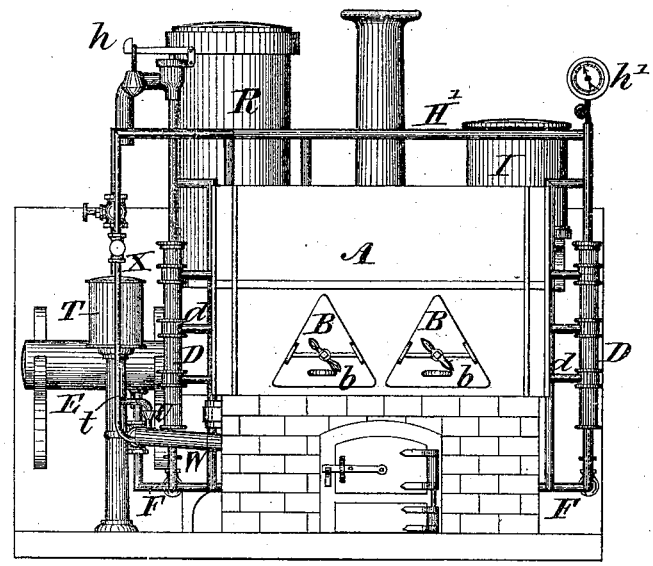
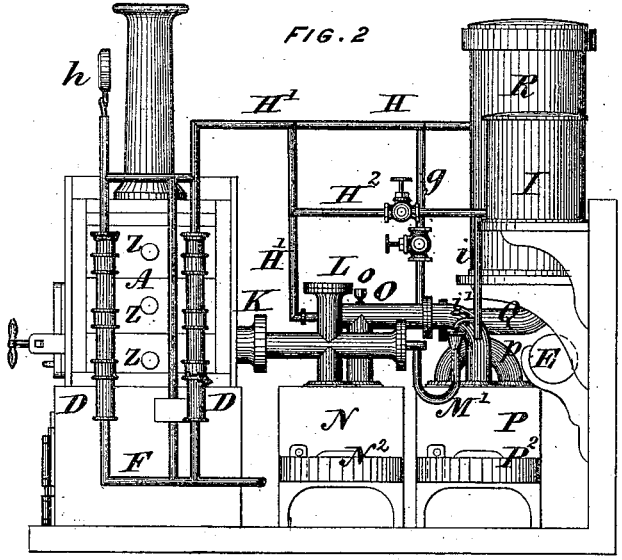

3 Sheets—Sheet 2.

J. RIGBY.
APPARATUS FOR MANUFACTURING GAS FROM PETROLEUM, &c.

No. 186,692. Patented Jan. 30, 1877.

Witnesses: Inventor:
James Rigby

3 Sheets—Sheet 3.
J. RIGBY.
APPARATUS FOR MANUFACTURING GAS FROM PETROLEUM, &c.
No. 186,692. Patented Jan. 30, 1877.
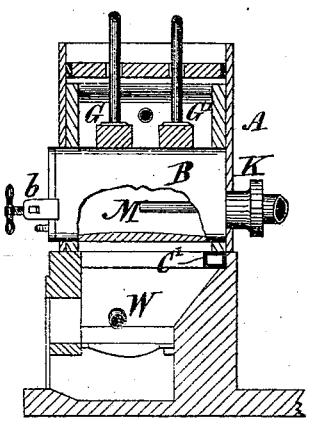
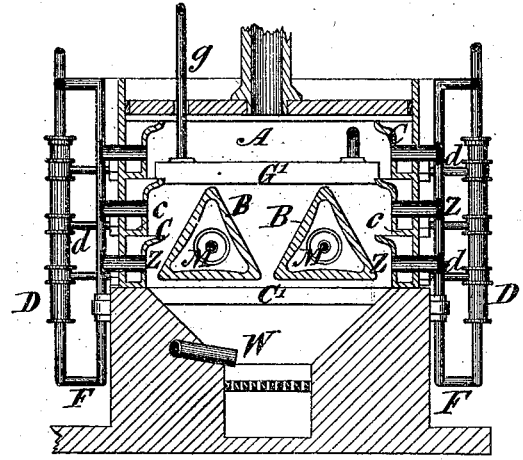
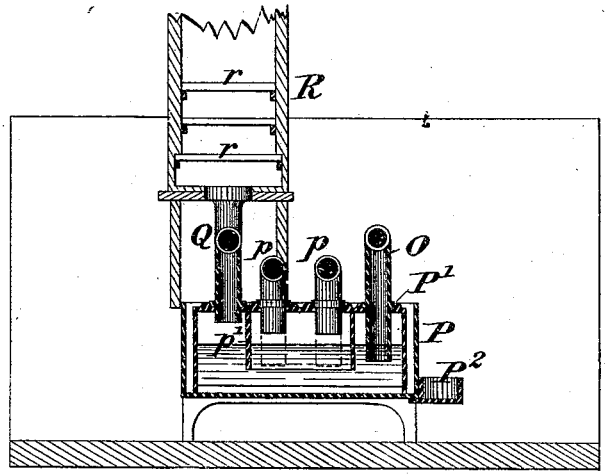
Witnesses: Inventor:

UNITED STATES PATENT OFFICE.

JAMES RIGBY, OF MONTREAL, QUEBEC, CANADA.

IMPROVEMENT IN APPARATUS FOR MANUFACTURING GAS FROM PETROLEUM, &c.

Specification forming part of Letters Patent No. 186,692, dated January 30, 1877; application filed July 28, 1876.

*To all whom it may concern:*

Be it known that I, JAMES RIGBY, of the city of Montreal, in the district of Montreal, and Province of Quebec, Canada, have invented certain new and useful Improved Apparatus for the Manufacture of Gas from Petroleum and other Hydrocarbons; and I do hereby declare that the following is a full, clear, and exact description of the same.

For full comprehension of my invention, reference must be had to the annexed drawings, in which—

Figure 3:
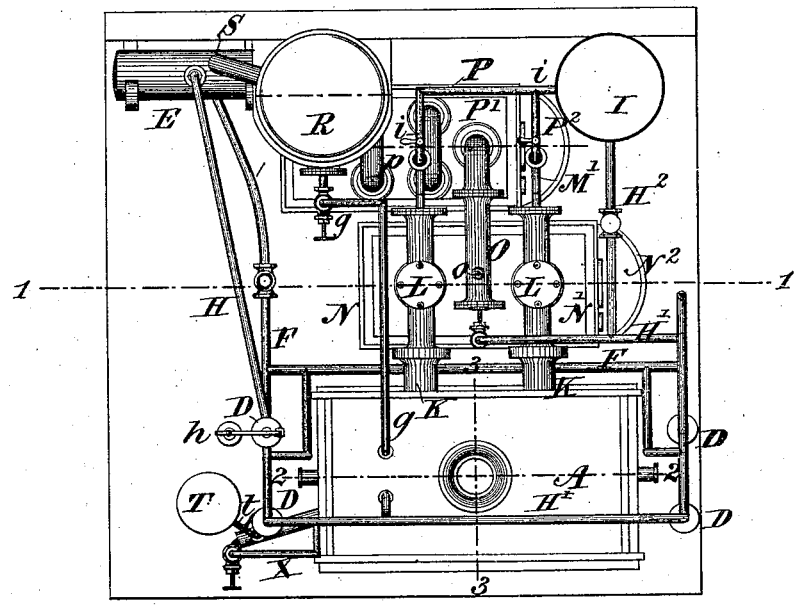
Figure 4:
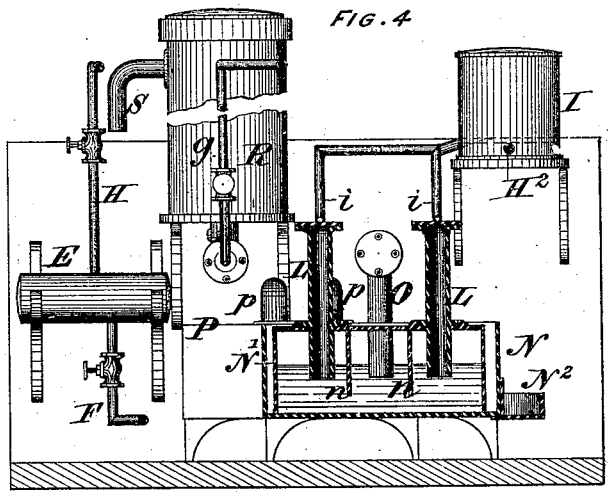

Figure 1 shows a front view of the apparatus. Fig. 2 shows a side view of the apparatus. Fig. 3 shows a plan view of the apparatus. Fig. 4 shows a transverse sectional elevation on line 1 1, Fig. 3. Fig. 5 shows a section of furnace on line 2 2, Fig. 3. Fig. 6 shows a section of furnace on line 3 3, Fig. 3. Fig. 7 shows a detail of scrubber and purifier.

Similar letters of reference indicate like parts.

A is the furnace, in which the retorts B are placed, it being built up, preferably, of iron plates strengthened at the angles, and, if desired, lined both at front and rear with firebrick or tile, the iron plates being, by preference, made interchangeable, so that the furnace may be easily repaired and extended both vertically and horizontally, to contain any desired number of retorts. C C are the water-backs, which form the sides of the furnace, having their inner faces, as shown in Fig. 5, arranged, by preference, so as to turn the products of combustion onto the retorts. They may either form one chamber on each side, or, as shown in the drawings, be divided up by horizontal diaphragms $c$ into several compartments, communicating with each other by the stand-pipes D, provided with connecting-pipes $d$. From the water-tank E, placed preferably where shown in Figs. 3 and 4, a pipe, F, provided with proper stop-cock, leads to the lower ends of these stand-pipes. From these water-backs or steam-generators the live steam is fed to the superheaters G G, arranged where shown in the furnace, and also passes off by the pipes H, $H^1$, and $H^2$, the first of these leading to the tank E, and serving the twofold purpose of exerting pressure, and to some extent heating the water. The branch $H^1$ is connected, as will be more particularly described hereafter, and that marked $H^2$, connected therewith, is led to the oil-tank I, in which it terminates in a coil, or is stopped under a false bottom, &c., this being for the purpose of preventing the hydrocarbon from thickening in cold weather. In the rear of the furnace, and as shown more particularly in Fig. 6, is placed the water-bridge $C'$, connecting the water-backs, and having separate inlet-pipes for water and outlet-pipes for steam.

It will easily be understood from the above that by this arrangement there is a perfectly even pressure of steam over all these parts, and that, the equilibrium being perfect, the apparatus works entirely without noise. In order, however, to entirely obviate any chance of danger from explosion, I have provided a safety-valve, $h$, steam-gage $h'$, &c.

The retorts which I prefer to use are, in section, an equilateral triangle, as shown in the Letters Patent No. 135,666, already granted to me, the sides being, however, rounded downward each way from the center, so that the oil admitted must flow in every direction. The retorts have on their front ends lids $b$, with fastenings, all of the ordinary type.

K K are pipes, preferably flanged, and secured to the rear end of these retorts, connecting with and intersecting the stand-pipes L, which, in the case of the furnace being enlarged vertically, must be lengthened correspondingly. Through these pipes K, and extending, as shown in Fig. 6, some distance into the retorts, run pipes M, each of these having at its outer end a siphon-bend and funnel, $M'$, into which the oil or hydrocarbon used runs from the pipes $i$ $i$, leading from the oil-tank I, its flow being controlled by the cock $i'$.

N is the washer, constructed preferably as shown in Fig. 4, having an inner box, $N^1$, placed within it, in which is secured, between the inlet or stand pipes L and the outlet-pipe O, transverse diaphragms or mid-feathers $n$. This outlet-pipe O dips into the purifier P, and has connected to it where shown the pipe H¹, conveying live steam from the water-backs C, and furnished with an injector, the jet of steam thus conveyed serving to break up the gas and cause it to deposit the heavier particles of carbon, which, falling into the vessel N, flow into a trough, N², and are run off for use, as will be presently described. Upon the pipe O is also placed, as shown in Figs. 2 and 3, an inlet-cock, o, for the introduction of atmospheric air. This, if desired, may be a dial-cock.

The second washer or purifier P is constructed as shown more particularly in Fig. 7. It has an inner box or shell placed within it, which contains two or more siphons, p, passing up through the top of P¹, and having their lower ends alone dipping in the liquor contained in the vessel. The short ends of these siphons are inclosed within a diaphragm, p', extending from the top of the vessel down into the liquor. The purifier P is also provided with a trough, P², into which flows the residuum precipitated in this vessel, and from which it can be removed when required for use. From this vessel P a pipe, Q, conducts the gas to the scrubber R, to this pipe being connected the pipe g, conveying from the superheater G the superheated steam. Upon the pipe Q is also arranged an inlet-pipe for the introduction, if desired, of atmospheric air at this point.

The construction of the scrubber R is shown in Fig. 7, in it being arranged two or more trays, r r, upon which coke is laid, this performing the final purification of the gas, which then passes off by the pipe S to the gasometer, or for direct use.

With the exception of the water-bridge C', before spoken of, the construction of the furnace presents no novelty as regards the fire-chamber proper, grate, fire-door, ash-pit, and ash-pit door, which are all of the usual type. I propose, however, to utilize as fuel in this furnace the residuum (i e., heavy tar and hard carbon) precipitated, as described, in the vessels N and P, and for this purpose provide the apparatus now to be described. T is a vessel of any suitable size and shape, in which the residuum is placed, and from which it flows through a pipe, t, provided with proper stop-cock, into a funnel, U, and thence through a pipe, W, which, as shown in Figs. 1 and 5, distributes it over the fire-bars. With the outer end of this pipe W is connected a steam-pipe, X, communicating with the pipe H¹ at any suitable point for furnishing a jet of steam, by which the residuum is carried on to the fire in a fine spray mingled with steam.

Z Z are apertures in the sides of the furnace A, through which the state of the retorts may be observed, and by opening which the strength of the blast may be controlled. These are, of course, provided with proper stoppers.

The operation of my invention will be so clearly understood from the drawings, and from the foregoing description of its construction, that I need allude but very slightly to it, merely stating that when the apparatus is in full work the process will be somewhat as follows: The petroleum or other hydrocarbon, flowing from the tank I in a very small stream through the pipe i, (its flow being regulated by the stop-cock i') falls into the siphon M', and thence runs through the pipes M into the retorts, where the gas is generated. This carbon gas, once generated, passes off through the pipes K K and stand-pipes L L into the washer N, where, by means of the mid-feathers n, it is thoroughly immersed in the liquor contained in the washer, and thence issues through the outlet-pipe O, being, on its way, exposed to a jet of steam, generated in the water-backs C C, and carried along the pipes H¹, this serving, as before mentioned, to break up and deposit in the washer the hard carbon, heavy tar, &c., contained in the gas at this stage.

The gas may also now be mixed with atmospheric air introduced through the inlet-cock o, and then passes into the purifier P, where it has to traverse the length of the siphons p, being, on its issue, usually diluted by the introduction of superheated steam generated in the superheater G, placed in the furnace, and, if desired, a still further supply of atmospheric air may be let in at this point.

The gas, having been still further purified by its passage through the coke placed on the trays r, contained in the scrubber R, is finally carried off to the gasometer, which is of the ordinary kind, and may be placed in any convenient situation.

Although but two retorts are in the drawings shown in this furnace, it must be fully understood that my apparatus is capable of indefinite extension, the only requisites being that in such a case the size and number of the purifying-vessels should be increased, and the stand pipes L and supply-pipes from oil-tank should be extended.

Having thus described my invention, what I claim is as follows:

1. In a gas-furnace, the combination, with the gas-outlet pipe from the retort, of the inlet-pipe for hydrocarbon, arranged centrally in the outlet-pipe, and extending from its junction with the retort to or near the center of the retort, as herein described.

2. In combination with a gas-furnace, water-backs arranged on either side of the retort-chamber, divided up horizontally into compartments, connected by stand-pipes, and having their inner faces extending upward and inward, to throw the products of combustion against the retorts, as herein set forth.

3. In the furnace A, the combination therewith of the water-backs connected by water-bridge, and communicating with the water-tank by pipe H, inlet-pipe F, and stand-pipes D, for the purpose of securing perfect equilibrium, as herein set forth.

4. The combination of the furnace A with retorts B, washer N, second washer or purifier P, scrubber R, oil-tank I, and water-tank E, all constructed, arranged, connected together, and operating substantially in the manner and for the purpose set forth.

JAMES RIGBY.

Witnesses:
FRAS. HY. REYNOLDS,
ROBT. ARTHUR KELLOND.